(12) United States Patent
Asikkala et al.

(10) Patent No.: US 10,633,605 B2
(45) Date of Patent: Apr. 28, 2020

(54) PROCESS FOR MODIFYING BIO-OIL

(71) Applicant: UPM-Kymmene Corporation, Helsinki (FI)

(72) Inventors: Janne Asikkala, Lappeenranta (FI); Andrea Gutierrez, Lappeenranta (FI)

(73) Assignee: UPM-KYMMENE CORPORATION, Helsinki (FI)

( * ) Notice: Subject to any disclaimer, the term of this patent is extended or adjusted under 35 U.S.C. 154(b) by 392 days.

(21) Appl. No.: 14/201,215

(22) Filed: Mar. 7, 2014

(65) Prior Publication Data

US 2014/0250774 A1 Sep. 11, 2014

(30) Foreign Application Priority Data

Mar. 8, 2013 (FI) .................................... 20155226

(51) Int. Cl.
*C10L 1/02* (2006.01)

(52) U.S. Cl.
CPC .................. *C10L 1/02* (2013.01); *Y02E 50/14* (2013.01); *Y02P 30/20* (2015.11)

(58) Field of Classification Search
CPC ....................................................... C10L 1/14
See application file for complete search history.

(56) References Cited

U.S. PATENT DOCUMENTS

| 5,582,808 | A | 12/1996 | Patek | |
|---|---|---|---|---|
| 2012/0023809 | A1* | 2/2012 | Koch | C10L 1/02 44/307 |

FOREIGN PATENT DOCUMENTS

| CN | 101892079 A | * | 11/2010 | |
|---|---|---|---|---|
| CN | 101892079 A | * | 11/2010 | |
| CN | 101544910 | | 7/2012 | |
| KR | 101392870 B1 | * | 5/2014 | |
| WO | 9926937 A1 | | 6/1999 | |
| WO | WO-9926937 A1 | * | 6/1999 | ............. C07C 7/148 |
| WO | WO-2010088486 A1 | * | 8/2010 | ............. C10G 45/00 |

OTHER PUBLICATIONS

Machine Translation of CN 101892079 A.*
Machine Translation of CN 101892079.*
Machine Translation of CN-101892079-A (Year: 2010).*
Machine Translation of KR-101392870-B1 (Year: 2014).*
Hanninen et al., "Distribution of lignin and its coniferyl alcohol and coniferyl aldehyde groups in Picea abies and Pinus silvestris as observed by Raman imaging", Phytochemistry, 2011, vol. 72, pp. 1889-1895.
Kuznetsov et al., "the study of different methods of bio-liquids production from woods biomass and from biomass/polyolefine mixtures", International Journal of Hydrogen Energy, 2009, vol. 34, pp. 7051-7056.

(Continued)

*Primary Examiner* — James C Goloboy
*Assistant Examiner* — Ming Cheung Po
(74) *Attorney, Agent, or Firm* — Cantor Colburn LLP

(57) ABSTRACT

Disclosed is a process for modifying of bio-oil, the process including the steps where feedstock including bio-oil is allowed react with a reducing agent in at least one polar solvent, to obtain modified bio-oil. Also disclosed is the use modified bio-oil, obtainable by the process, as heating oil, as starting material in processes for producing fuels, fuel components, fine chemicals, chemical building-blocks, and solvents.

10 Claims, 1 Drawing Sheet

(56) References Cited

OTHER PUBLICATIONS

Nagy et al., "Catalytic hydrogenolysis of ethanol organosolv lignin", Holzforschung, 2009, vol. 63, pp. 513-520.
Pan et al., "Effect of Organosolv Ethanol Pretreatment Variables on Physical Characteristics of Hybrib Poplar Substrates", Applied Biochemistry and Biotechnology, 2007, vol. 136-140.
Zakzeski et al., "The Catalytic Valorization of Lignin for the Production of Renewable Chemicals", Chem. Rev., 2010, vol. 110, pp. 3552-3599.
European Search Report, dated Aug. 1, 2014, from corresponding EP application.
Finnish Search Report dated Nov. 4, 2013 in corresponding priority application.
Machine Translation for CN 101892079, Date of Publication: Nov. 24, 2010, 13 Pages.

* cited by examiner

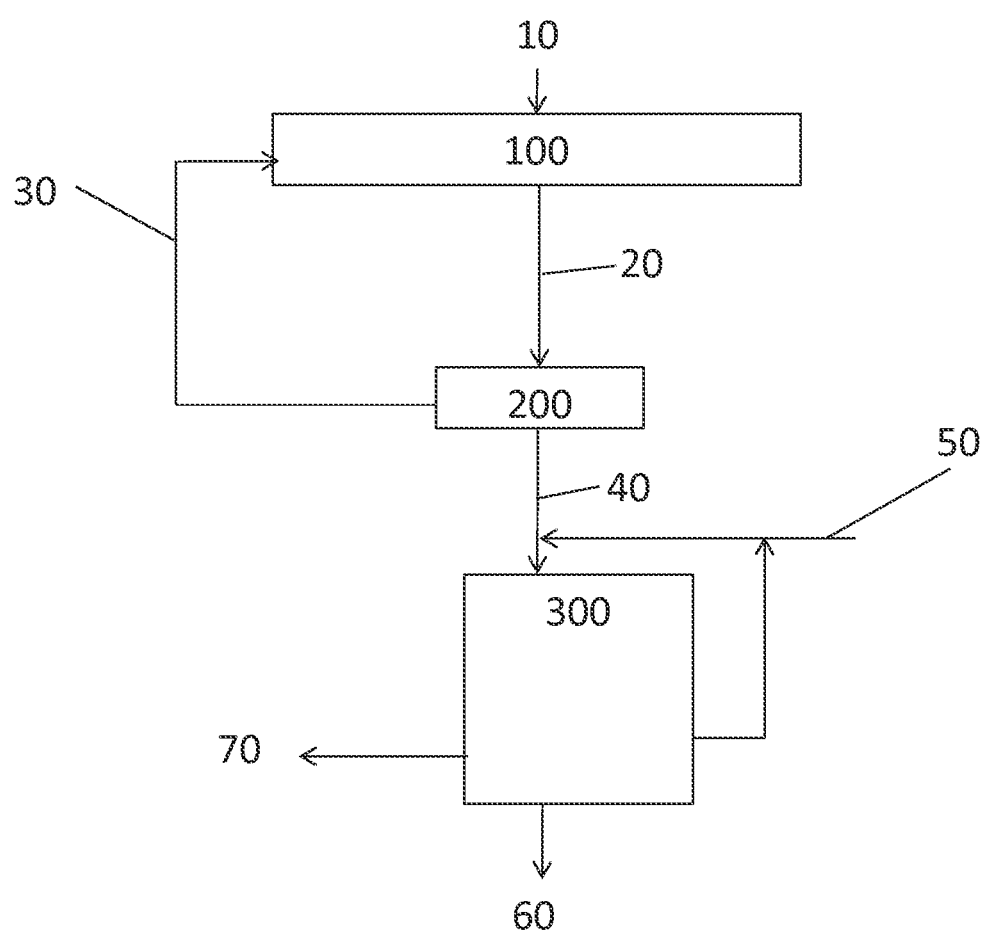

PROCESS FOR MODIFYING BIO-OIL

FIELD OF THE INVENTION

The present invention relates to the modifying of bio-oil, whereby the stability of said bio-oil is improved and composition is altered. The invention also relates to subjecting bio-oil to reducing conditions for accomplishing the desired modification. The invention also relates to modified bio-oils obtainable by said process.

BACKGROUND OF THE INVENTION

Bio-oils of varying properties and compositions are obtained using numerous methods and processes. Bio-oils may be obtained for example from biomass using any suitable thermal treatment, pyrolysis and the like.

Pyrolysis is generally understood as the chemical decomposition of organic materials by heating in the absence or with limited supply of oxidizing agent such as air or oxygen. Pyrolysis can be used for converting biomass to pyrolysis oil which is an example of bio-oil. Commercial pyrolysis applications are typically either focused on the production of charcoal (slow pyrolysis) or production of liquid products (fast pyrolysis), the pyrolysis oil. Both the slow pyrolysis and the fast pyrolysis processes may be used for the manufacture of pyrolysis oil.

During pyrolysis of biomass, for example of lignocellulosic material, carried out typically at temperatures in the range 400-700° C., most of the cellulose and hemicellulose and part of lignin typically disintegrate to form smaller and lighter molecules which are vapors at the pyrolysis temperatures. During cooling some of the vapors condense forming a liquid product, called pyrolysis oil.

Bio-oils are complex mixtures of chemical compounds, including reactive aldehydes and ketones. Said reactive compounds react with each other whereby complex molecules having higher molecular weight are formed and the viscosity of bio-oil is increased. For example biomass derived pyrolysis oil typically comprises water, light volatiles and non-volatiles. Further, pyrolysis oil has high acidity, which typically leads to corrosion problems, substantial water content, and high oxygen content.

Wood-based pyrolysis oil is the product of pyrolysis of wood or forest residues and it contains typically carboxylic acids, aldehydes, ketones, carbohydrates, thermally degraded lignin, water, and alkali metals. The oxygen-containing compounds (typically 40-50 wt-%) and water (typically 15-30 wt-%) make pyrolysis oils chemically and physically unstable. Although pyrolysis oils have higher energy density than wood, they are acidic (pH~2) and incompatible with conventional fuels. Furthermore pyrolysis oils have high viscosity and high solid content. Poor stability and high acidity are one of the key problems in utilizing the pyrolysis oil or storing them for longer periods.

Due to its instability bio-oil is rapidly transformed to semisolid and gradually solid material, which is difficult to store or use for any further purposes. Thus, according to present practice it is necessary to process the bio-oils rapidly further in order to avoid the problems relating to stability.

Despite the ongoing research and development relating to bio-oils, there is still a need to provide a process for modifying bio-oil for obtaining bio-oils with increased stability.

SUMMARY OF THE INVENTION

The present invention relates a process for modifying of bio-oil, whereby the stability of said bio-oil is improved and composition is altered. Particularly the present invention relates to a process for modifying of bio-oil, where feedstock comprising bio-oil is subjected to reduction in the presence of a reducing agent selected from $NaBH_4$ (sodium borohydride) and $Na_2O_4S_2$ (sodium dithionite, known also as sodium hydrosulphide), under conditions suitable for enacting said reduction. In the process carbonyl compounds, particularly aldehydes and ketones are converted to alcohols, whereby the modified bio-oil is maintained in liquid form for long periods of time and it can be stored without problems for more than 6 months.

The present invention also provides modified bio-oil with improved stability, where carbonyl compounds are converted to corresponding alcohols. Said modified bio-oil may be used as such as heating oil and as starting material in processes for producing fuels, fuel components, fine chemicals and chemical building-blocks for chemical production and solvents The process for modifying of bio-oil comprises the steps where a feedstock comprising bio-oil is allowed react with a reducing agent selected from $NaBH_4$ (sodium borohydride) and $Na_2O_4S_2$ (sodium dithionite, known also as sodium hydrosulphide), in at least one polar solvent, to obtain modified bio-oil.

Thus an object of the invention is to provide a process for effectively and economically modifying of bio-oil, whereby the stability of said bio-oil is improved and composition is altered.

Another object of the invention is to provide modified bio-oil with improved stability, where said bio-oil may be used as such or in the manufacture of valuable components.

Still another object of the invention is to provide modified bio-oils based at least partly or totally on renewable starting materials, for use as such or in the manufacture of valuable components.

Definitions

The term "hydroprocessing" refers here to catalytic processing of organic material by all means of molecular hydrogen.

The term "carbonyl compounds" refers here to all organic molecules containing one or more carbonyl groups, particularly aldehydes and ketones.

The term "chemical building-blocks" or "building-block chemicals" refer to chemical compounds useful as starting materials and intermediates for the manufacture of chemical and pharmaceutical final products. Examples of such chemical building-blocks are fumaric acid, furfural, glycerol, citric acid, treonin, propanic acid etc.

Transportation fuels refer to fractions or cuts or blends of hydrocarbons having distillation curves standardized for fuels, such as for diesel fuel (middle distillate from 160 to 380° C., EN 590), gasoline (150-210° C., EN 228), aviation fuel (160 to 300° C., ASTM D-1655 jet fuel), kerosene, naphtha, etc.

BRIEF DESCRIPTION OF THE DRAWINGS

FIG. 1 is a schematic flow diagram representing one embodiment of the process for modifying bio-oils.

DETAILED DESCRIPTION OF THE INVENTION

It was surprisingly found that the reduction of carbonyl compounds in bio-oils, particularly aldehydes and ketones, with a reducing agent selected from NaBH$_4$ (sodium borohydride) and Na$_2$O$_4$S$_2$ (sodium dithionite, known also as sodium hydrosulphide) to yield alcohols can be used for effectively stabilizing said bio-oils. Simultaneously small molar mass (C1-C6) alcohols produced in said reduction react further with acids in the bio-oil to produce esters and thereby further stabilize the bio-oil and reduce the acidity of it.

FIG. 1 is a schematic diagram of a process in accordance with one embodiment of the invention. This embodiment is particularly suitable for a process on large industrial scale using an outlet for gaseous components (not shown in the FIGURE). NaHSO$_4$ formed from Na$_2$O$_4$S$_2$ in the reduction reaction may be separated by any suitable means, such as by precipitation with CaSO$_4$ or by ion exchange technique, for example using suitable ion exchange resins.

Sodium borohydride is a reducing agent used in organic chemistry. In the following reaction scheme 1 the general mechanism of sodium borohydride reduction of carbonyl is presented.

Scheme 1

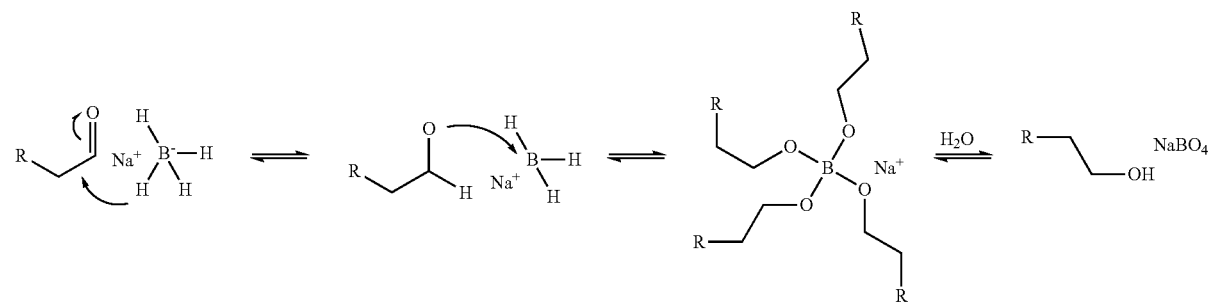

where solvents, such as alcohols may be separated conveniently prior to addition of the aqueous media. Particularly when operating on a smaller scale the aqueous media may be added without separating the solvent.

In the embodiment of FIG. 1, in the first step feedstock comprising bio-oil 10 is fed to a reduction reactor 100 wherein reduction is carried out in the presence of a reducing agent (NaBH$_4$) and at least one polar solvent, followed by subjecting the reduction reaction mixture 20 obtained from the reduction stage to solvent removal in a separation unit 200. The feedstock 10 may comprise solvent or the solvent may be charged to the reactor 100 separately (not shown in the FIGURE). The separated solvent 30 may be recycled to the reactor 100 if desired. Aqueous media, suitably water 50 is added to the remaining solvent free reaction mixture 40 obtained from the separation unit 200 and the obtained aqueous mixture is agitated in a reactor 300. The formed solid reaction product of the reducing agent (NaBO$_4$) 70 is separated from the aqueous mixture by suitable means, such as filtration (not shown in the FIGURE), water 50 is separated from the aqueous mixture by suitable means and it may recycled as the aqueous media. Modified bio-oil 60 is obtained as liquid product.

According to one embodiment the solvent removal step in the separation unit 200 may be omitted and the reduction reaction mixture 20 obtained from the reduction stage may be directed with the added aqueous media straight to reactor 300. After the step in the reactor 300 the solvent and water may be separated from the aqueous mixture, either separately or as a mixture, of which mixture the water may be separated for recycling to the reactor 300.

In the first step the solvent, bio-oil and reducing agent may be mixed and the mixture is then charged to the reduction reactor 100, or the solvent and reducing agent are separately charged to the reduction reactor 100, or the solvent and reducing agent may be mixed and the mixture is then charged to the reduction reactor 100.

In the case Na$_2$O$_4$S$_2$ is used as the reducing agent, gaseous SO$_2$ formed in the reaction is removed from reactor 100

Na$_2$O$_4$S$_2$ (sodium dithionite, known also as sodium hydrosulphide) works in a similar way as NaBH$_4$, and thus it is also a suitable reducing agent in the reaction.

The process for modifying of bio-oil comprises the steps where a feedstock comprising bio-oil is allowed react with a reducing agent selected from NaBH$_4$ (sodium borohydride) and Na$_2$O$_4$S$_2$ (sodium dithionite, known also as sodium hydrosulphide in at least one polar solvent to obtain modified bio-oil.

According to one embodiment the polar solvent(s) may be separated from the reduction reaction mixture after the reduction whereby solvent free reaction mixture is formed and an aqueous media is added to the solvent free reaction mixture to form an aqueous mixture. According to another embodiment the aqueous media is added to the reduction reaction mixture after the reduction to form an aqueous mixture. Said aqueous mixture is suitably agitated. The reaction product of the reducing agent, and solvent(s) and water may be separated from the aqueous mixture in any order.

According to one embodiment the process for modifying of bio-oil comprises the steps where a) a feedstock comprising bio-oil is reacted with a reducing agent selected from NaBH$_4$ and Na$_2$O$_4$S$_2$ in at least one polar solvent and a reduction reaction mixture is formed, and b) modified bio-oil is obtained.

In the process the reduction reaction mixture formed in step a) may be subjected to step c) or d), where in step c) the polar solvent(s) is separated from the reduction reaction mixture, a solvent free reaction mixture is formed and an aqueous medium is added to the solvent free reaction mixture, and water and reaction product formed of the reducing agent are separated, or in step d) an aqueous medium is added to the a reduction reaction mixture, and water and reaction product formed of the reducing agent are separated.

The reaction product of the reducing agent refers here to NaBO$_4$ (from NaBH$_4$) and SO$_2$ and NaHSO$_4$ (from Na$_2$O$_4$S$_2$).

The obtained modified bio-oil contains alcohols and esters, which may easily be converted to other valuable products if desired. Examples of alcohols obtained with the process of the invention when using pyrolysis oil as feedstock include furan-2,5-diyldimethanol, methanol, ethanol, propanol, phenylmethanol and 4(hydroxymethyl)-2-methoxyphenol. Examples of esters obtained with the process of the invention from pyrolysis oil, as a result from the reaction of lower C1-C5 alcohols with acids in pyrolysis oil, include methyl acetate, methyl vanillate and ethyl succinate. The acid number of the modified bio-oil product is lower than that of the feedstock The feedstock comprising bio-oil is selected from bio-oils, pyrolysis oils and any fractions, and combinations thereof. Said bio-oils may be obtained from any known thermal or hydrothermal (thermal treatment with hydrogen) processing of biomass. Said pyrolysis oil may be obtained from any pyrolysis process of biomass, including slow pyrolysis, fast pyrolysis, catalytic pyrolysis, hydropyrolysis (catalyst+$H_2$) supercritical fluid treatment of biomass, molten salt treatment of biomass and ionic liquid treatment of biomass.

Biomass may typically comprise virgin and waste materials of plant, animal and/or fish origin or microbiological origin, such as virgin wood, wood residues, forest residues, waste, municipal waste, industrial waste or by-products, agricultural waste or by-products (including also dung or manure), residues or by-products of the wood-processing industry, waste or by-products of the food industry, solid or semi-solid organic residues of anaerobic or aerobic digestion, such as residues from bio-gas production from lignocellulosic and/or municipal waste material, residues from bio-ethanol production process, and any combinations thereof. Biomass may include the groups of the following four categories: wood and wood residues, including sawmill and paper mill discards, municipal paper waste, agricultural residues, including corn stover (stalks and straw) and sugarcane bagasse, and dedicated energy crops, which are mostly composed of tall, woody grasses.

Suitably biomass is selected from non-edible sources such as non-edible wastes and non-edible plant materials. Particularly suitably said biomass comprises waste and by-products of the wood-processing industry such as slash, urban wood waste, lumber waste, wood chips, wood waste, sawdust, straw, firewood, wood materials, paper, by-products of the papermaking or timber processes, where the biomass (plant biomass) is composed of cellulose and hemi-cellulose, and lignin.

The pyrolysis oil refers particularly to a complex mixture of oxygen containing compounds (oxygenates), comprising typically water, light volatiles and non-volatiles. Pyrolysis oil is acidic, with a pH of 1.5-3.8, and wood based pyrolysis oil typically has pH between 2 and 3. The exact composition of pyrolysis oil depends on the biomass source and processing conditions. Typically pyrolysis oil comprises 20-30% of water, 22-36% of suspended solids and pyrolitic lignin (including low molecular mass lignin and high molecular mass lignin), 8-12% of hydroxyacetaldehyde, 3-8% of levoglucosan, 4-8% of acetic acid, 3-6% of acetol, 1-2% of cellubiosan, 1-2% of glyoxal, 3-4% of formaldehyde, and 3-6% of formic acid by weight. Pyrolysis oil typically also comprises other ketones, aldehydes, alcohols, furans, pyranes, sugars, organic acids, lignin fragments, phenolics, extractives and small amounts of inorganics. The density of pyrolysis oil is approximately 1.2-1.3 kg/l and usually the water molecules which are split during pyrolysis stay bound within the complex pyrolysis liquid as an emulsion.

Optionally bio-oil fractions, suitably pyrolysis oil fractions may be used as feedstock or as part of it. Said fractions are suitably obtained by subjecting the bio-oil, particularly pyrolysis oil to one or more fractionation treatments. If desired, said fractions may be dried, whereby water is removed.

The polar solvent is selected from C1-C10 alcohols, ethers and water and any combinations thereof, suitably from C1-C5 alcohols, tetrahydrofuran and diethylether, particularly suitably methanol is used.

Suitably the bio-oil is dissolved in the polar solvent, using heating if necessary, prior to the addition of the reducing agent.

The amount (mass ratio) of the reducing agent/bio-oil is suitably from 1:10 to 10:1 (wt/w), particularly from 4:10 to 6:1 (w/w), and according to one embodiment suitably from 6:10 to 4:1 (w/w).

The reaction with the reducing agent is carried out at a temperature from 20 to 200° C., suitably from 20 to 100° C.

The reaction with reducing agent is carried out under a pressure from normal atmospheric pressure NTP to 25 bar, suitably from 1 to 15 bar The reaction with reducing agent is allowed to proceed from 0.5 to 20 h, suitably from 1 to 8 h, and particularly suitably from 1 to 6 h.

After the reduction reaction the reaction product of the reducing agent, and solvent(s) and water are separated to obtain modified bio-oil.

In the embodiment where $NaBH_4$ is used as the reducing agent, an aqueous media is added to the reaction mixture, suitably in a volumetric amount from 1:5 to 5:1 with respect to the volumetric amount of the polar solvent.

The aqueous media is selected from water, waste water streams, recirculated aqueous streams from the process or from another processes. Said aqueous media is suitably free of metals, alkali metals and solid particles. Suitably tap water or deionized water is used.

The $NaBO_4$ formed of $NaBH_4$ is separated from the aqueous mixture by any suitable means, such as precipitation with CaOH or by anion exchange or activated carbon filtration.

In the embodiment where $Na_2O_4S_2$ is used as the reducing agent, $Na_2O_4S_2$ is added as an aqueous solution (120-200 g/l) to the reaction mixture suitably in a volumetric amount from 1:10 to 10:1 with respect to the volumetric amount of the bio-oil.

The $SO_2$ (gas) formed is separated from the reactor 100 via an outlet for gases and $NaHSO_4$ formed is separated from the aqueous mixture by any suitable means, such as precipitation with $caSO_4$ or by anion exchange or activated carbon filtration.

Water and other solvents are removed from the aqueous mixture by any suitable means e.g. distillation.

The process may be carried out a batch process, semi-batch process or a continuous process. Any suitable apparatus known in the art may be used for said process.

An oily, liquid, modified bio-oil product is obtained having less acidity, lower amount of acids, lower amount of oxygen containing compounds, decreased viscosity, and higher amount of alcohols when compared with the bio-oil used as feedstock. The product has clearly increased stability.

With the process bio-oils, particularly pyrolysis oils can be upgraded in an effective and economic way.

The modified bio-oil product may be used as such for heating purposes as heating oil, where it provides clear advantages, such as higher heating value and higher quality than that of conventional bio-oils, such as pyrolysis oils. Due the improved stability and quality it may also be used as starting material in wider range of processes including processes for producing fuels, fuel components, particularly transportation fuels, fine chemicals and chemical building-blocks for chemical production, and solvents.

If desired, the modified bio-oil product may be subjected to any known hydroprocessing steps, and any pretreatment and purification steps. In the hydroprocessing steps, such as further processing to fuels, the consumption of hydrogen is lowered considerably, making the production process more efficient. Also the alcohols contained in the modified bio-oil product are more easily and selectively converted into other compounds than the compounds originally present in bio-oils, such as pyrolysis oil.

The following example is illustrative of embodiments of the present invention, as described above, and it is not meant to limit the invention in any way. The invention is illustrated also with reference to the drawing.

Example 1

Reduction of Pyrolysis Oil

The pyrolysis oil (50 g) was dissolved in methanol (75 ml) in the reaction vessel. $NaBH_4$ was added slowly. During $NaBH_4$ addition the reaction mixture was heated to about 60° C. After all $NaBH_4$ was added reaction mixture was heated to reflux (65° C.) and reaction was continued for 5 h. Samples were taken right after all $NaBH_4$ was added and once every hour to monitor the progress of the reaction. The reaction mixture was quenched with addition of 75 ml water. The solvents and $NaBO_4$ were removed and modified bio-oil was recovered. GC-MS revealed e.g. butanol, coniferyl alcohol, propyl guacyl etc. TAN number (Total Acid Number) was reduced from 120 of starting material (pyrolysis oil) to 90 of product (modified pyrolysis oil).

The present invention has been described herein with reference to specific embodiments. It is, however clear to those skilled in the art that the process(es) may be varied within the bounds of the claims.

The invention claimed is:
1. A process for modifying of bio-oil, wherein said process comprises the steps of
 a) dissolving a feedstock consisting of bio-oil selected from bio-oils obtained from thermal or hydrothermal processing of biomass, pyrolysis oils obtained from a pyrolysis process of biomass, and fractions and combinations thereof, in at least one polar solvent selected from C1-C10 alcohols and ethers,
 b) reacting the feedstock consisting of bio-oil in the at least one polar solvent with a reducing agent selected from $NaBH_4$ and $Na_2O_4S_2$ to form a reduction reaction mixture; wherein carbonyl compounds in the bio-oil are reduced, and
 c) obtaining modified bio-oil,
 wherein the method further comprises separating the reducing agent from the reduction reaction mixture; where in separating the reducing agent from the reduction reaction mixture comprises subjecting the reduction reaction mixture to step d), wherein the at least one polar solvent is separated from the reduction reaction mixture, a solvent free reaction mixture is formed and an aqueous medium is added to the solvent free reaction mixture, and water and reaction product formed of the reducing agent are separated.

2. The process according to claim 1, wherein the polar solvent is selected from C1-C5 alcohols, tetrahydrofuran, diethyel ether, and any combinations thereof.

3. The process according to claim 1, wherein the amount of the reducing agent/bio-oil is from 1:10 to 10:1 (w/w).

4. The process according to claim 1, wherein reaction is carried out at a temperature from 20 to 200° C.

5. The process according to claim 1, wherein the reaction is carried out under a pressure from normal atmospheric pressure NTP to 25 bar.

6. The process according to claim 1, wherein the aqueous medium is selected from water, waste water streams, recirculated aqueous streams from the process or from another processes.

7. The process according to claim 1, wherein the method further comprises processing the modified bio-oil product into a fuel, fuel component, fine chemicals, chemical building-blocks, and solvent.

8. The process according to claim 1, wherein the polar solvent is methanol.

9. The process according to claim 2, wherein the amount of the reducing agent/bio-oil is from 1:10 to 10:1 (w/w).

10. The process according to claim 1, wherein the pyrolysis oil is obtained from slow pyrolysis, fast pyrolysis, catalytic pyrolysis, hydropyrolysis, supercritical fluid treatment of biomass, molten salt treatment of biomass, or ionic liquid treatment of biomass.

* * * * *